(12) United States Patent
Jones et al.

(10) Patent No.: US 7,685,151 B2
(45) Date of Patent: Mar. 23, 2010

(54) COORDINATED EMPLOYEE RECORDS WITH VERSION HISTORY AND TRANSITION OWNERSHIP

(75) Inventors: Jeffrey Allen Jones, Round Rock, TX (US); Douglas Scott Rothert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 11/279,454

(22) Filed: Apr. 12, 2006

(65) Prior Publication Data

US 2007/0244917 A1   Oct. 18, 2007

(51) Int. Cl.
*G06F 7/00* (2006.01)
(52) U.S. Cl. ............... 707/102; 348/E5.006; 707/104.1
(58) Field of Classification Search ................... None
See application file for complete search history.

(56) References Cited

U.S. PATENT DOCUMENTS 6,415,298 B1   7/2002 Oesterer et al.
2003/0069839 A1 *   4/2003 Whittington et al. .......... 705/38
2003/0154480 A1   8/2003 Goldthwaite et al.
2003/0229529 A1 *   12/2003 Mui et al. ...................... 705/8
2004/0168172 A1   8/2004 Masuda
2004/0186852 A1 *   9/2004 Rosen ..................... 707/104.1
2004/0254942 A1   12/2004 Error et al.

* cited by examiner

*Primary Examiner*—Don Wong
*Assistant Examiner*—Shyue Jiunn Hwa
(74) *Attorney, Agent, or Firm*—Yee & Associates, P.C.; David A. Mims, Jr.

(57) ABSTRACT

A computer implemented method, data processing system, and computer usable program code are provided for associating historical events with a user. A historical event is identified for association with the user. A determination is made as to whether the historical event has been certified by a trusted authority in response to identifying the historical event for association with the user. A historical object is created for the historical event if the historical event has been certified by the trusted authority and associated with the user.

3 Claims, 6 Drawing Sheets

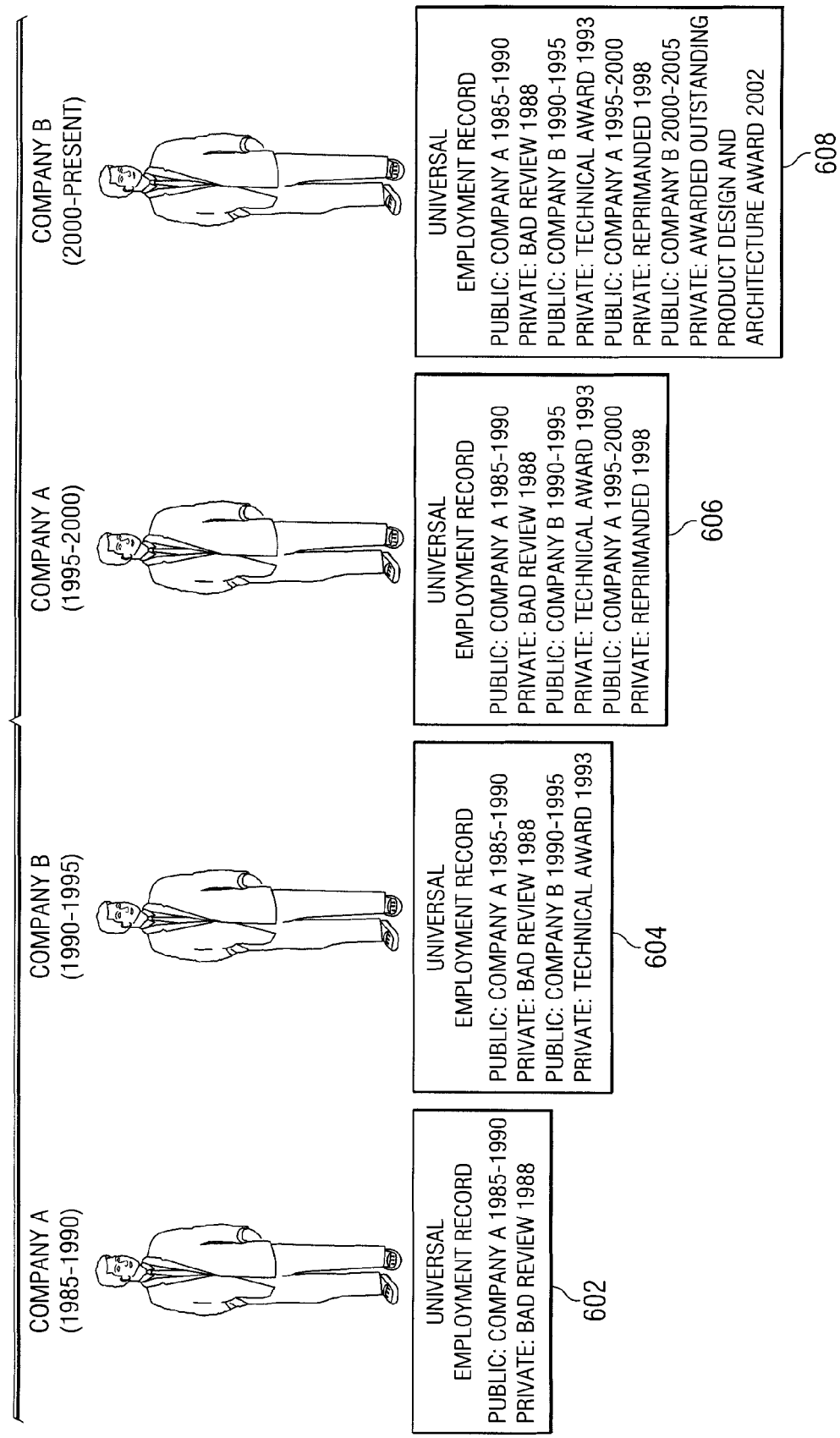

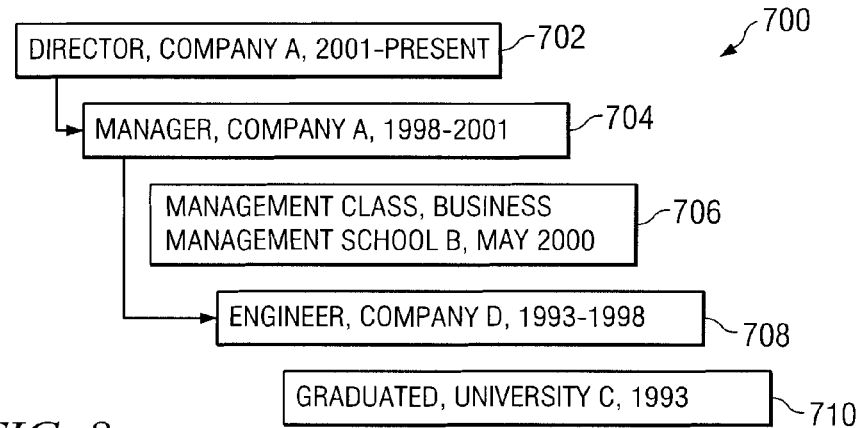
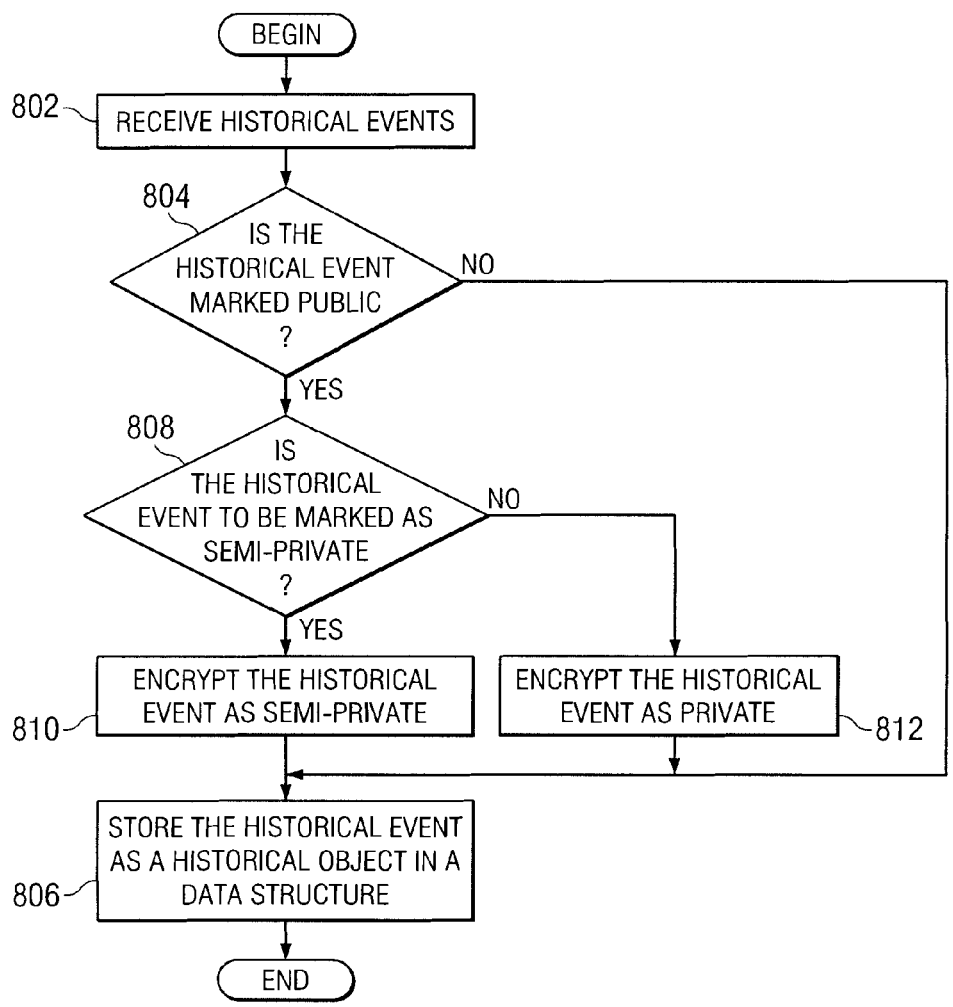

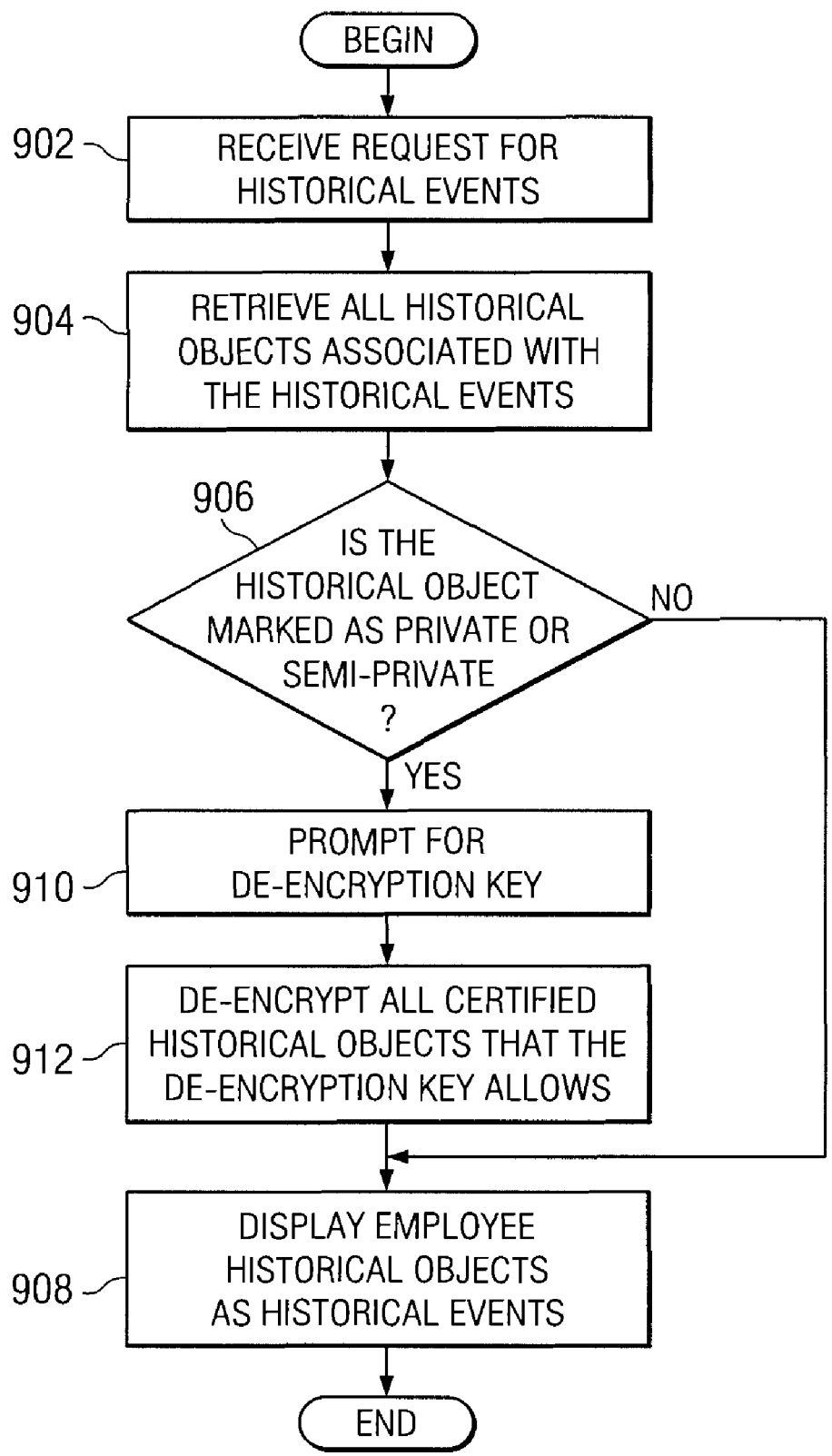

COORDINATED EMPLOYEE RECORDS WITH VERSION HISTORY AND TRANSITION OWNERSHIP

BACKGROUND OF THE INVENTION

1. Field of the Invention

The present application relates generally to storage of records. More specifically, the present application relates to coordinating employee records with version history and transition ownership.

2. Description of the Related Art

Records enable and support a company's work to fulfill its mission. Every organization, including Federal agencies, must address well-defined objectives that add value, either by achieving the organization's goals or by reducing costs. Since records contain information, a valuable resource, it is essential to take a systematic approach to the management of records.

Records managers use a records management engine and infrastructure tools to create e-records that enable business management applications. Records managers also add the benefits of e-records management to business applications, provide a single and consistent records management platform with extensive record keeping capabilities for both electronic and physical information assets, and help meet government and industry requirements for formal records management.

Records management is also used in human resources departments within companies to track personal and professional information of the company's employees. However, employees join and leave companies at a frequent pace. In most cases, when an employee leaves a company, most information, including ownership records and resources, associated with that employee are removed from the company's employee records. In such an event, the company may lose vital information that may have been associated between the employee and the position the employee occupied.

SUMMARY OF THE INVENTION

The different aspects of the illustrative embodiments provide a computer implemented method, data processing system, and computer usable program code for associating historical events with a user. The illustrative embodiments identify a historical event for association with the user. Responsive to identifying the historical event for association with the user, a determination is made as to whether the historical event has been certified by a trusted authority. The illustrative embodiments create a historical object for the historical event if the historical event has been certified by the trusted authority and associate the historical object with the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts an exemplary employee record in accordance with an illustrative embodiment;

FIG. 7 depicts a version history of an employee's records in accordance with an illustrative embodiment;

FIG. 8 is a flowchart of storing employee historical events in accordance with an illustrative embodiment; and FIG. 9 is a flowchart of retrieving employee historical events in accordance with an illustrative embodiment.

DETAILED DESCRIPTION OF THE PREFERRED EMBODIMENT

Figure 1:
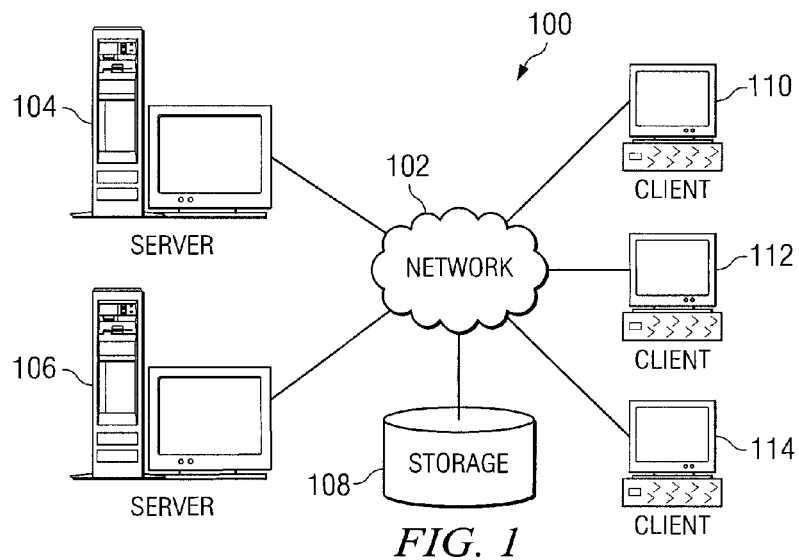
FIG. 1 depicts a pictorial representation of a network of data processing systems in which aspects of the illustrative embodiments may be implemented.
Figure 2:
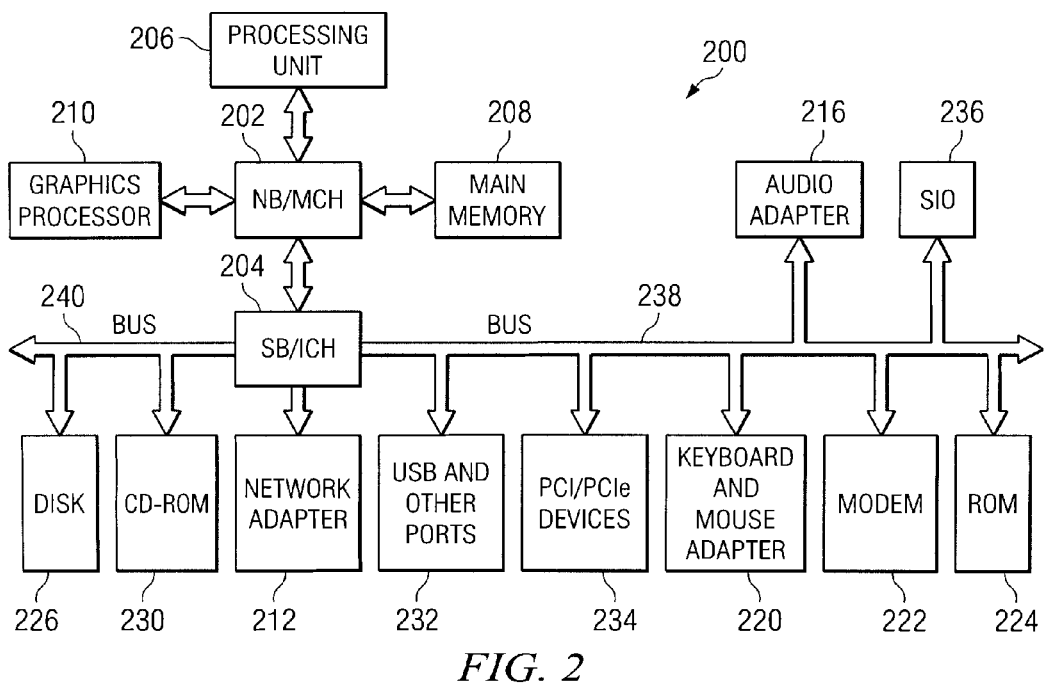
FIG. 2 depicts a block diagram of a data processing system in which aspects of the illustrative embodiments may be implemented.

The illustrative embodiments associate historical events of a user as well as providing certification for the historical events. With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the illustrative embodiments.

With reference now to the figures, FIG. 1 depicts a pictorial representation of a network of data processing systems in which aspects of the illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects of the illustrative embodiments may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the illustrative embodiments provide for a computer implemented method, apparatus, and computer usable program code for compiling source code. The methods of the illustrative embodiments may be performed in a data processing system, such as data processing system 100 shown in FIG. 1 or data processing system 200 shown in FIG. 2.

The illustrative embodiments provide for coordinating disparate pieces of employee information and provide for version control of employee records to associate how the employee's records and resources have moved between individuals. As an employee changes jobs both internally and externally, the employee records are updated with all pertinent information as well as all resources tied to the employee. These updates may be certified by the employer or by another entity as being certified information. This allows companies to quickly verify employment history and employee location information.

Figure 3:
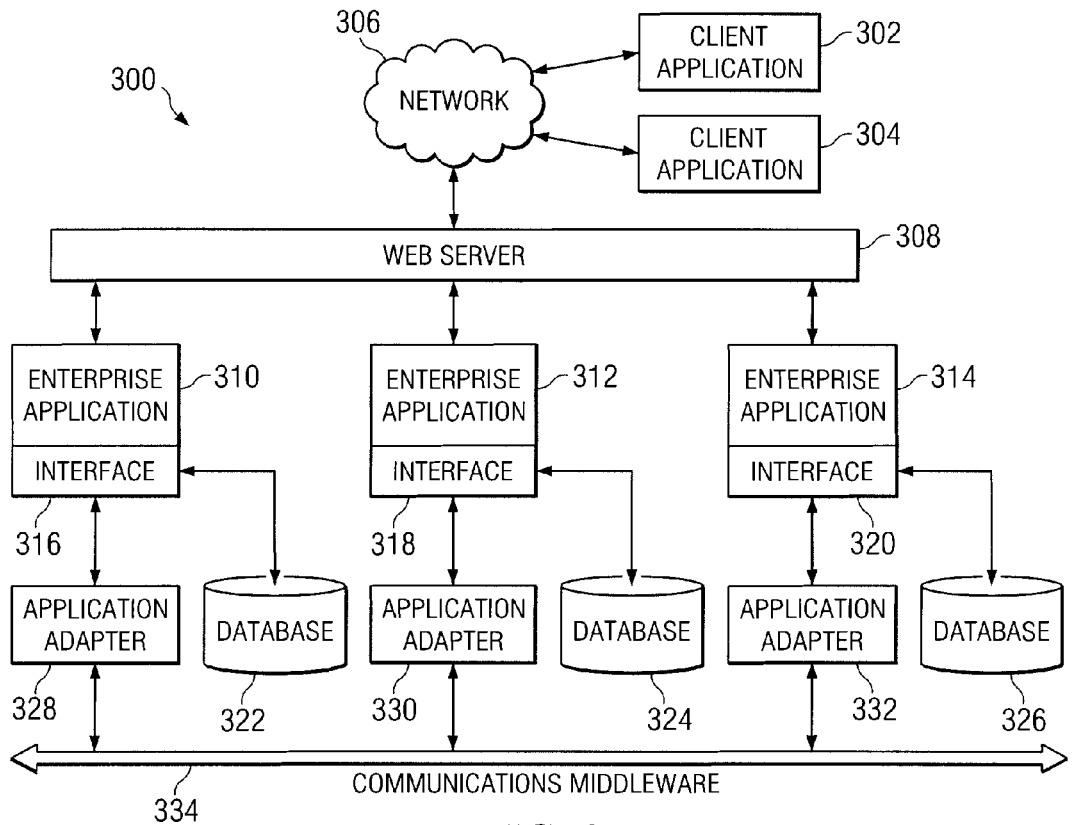
FIG. 3 depicts a functional block diagram of the architecture of an enterprise application in accordance with an illustrative embodiment.

Turning to FIG. 3, a functional block diagram of the architecture of an enterprise application is depicted in accordance with an illustrative embodiment. Enterprise applications are used by businesses and other entities to conduct every day business. Businesses may also use enterprise applications to collect and store employee information in a human resource environment. In the traditional enterprise architecture 300, client applications 302 and 304 access enterprise applications 310, 312, and 314 through network 306 and Web server 308. Network 306 and Web server 308 are similar to network 102 and server 104 of FIG. 1. Client application 302 and client application 304 may be an application running on clients 108, 110, and 112 of FIG. 1. Each enterprise application 310, 312, or 314 contains an interface 316, 318, and 320 to access database 322, 324, and 326. Databases 322, 324, and 326 are contained to storage 108 of FIG. 1 and may any type of data structure. Enterprise applications 310, 312, and 314's portfolio interoperability is facilitated by application adapters 328, 330, and 332 through interfaces 316, 318, and 320, which expose the information models and services into a distributed object framework or onto specialized communication middleware buses 334. Domain application adapters may also be used to perform data mapping to and from enterprise applications 310, 312, and 314. This functionality of the domain adapters limits their reusability because they are closely tied to object specifications in some master application acting as the entry point to the enterprise application services. Enterprise object models are organization specific. Whenever new services are needed, new data mapping may require retrofitting the entire architecture with the new capability.

Figure 4:
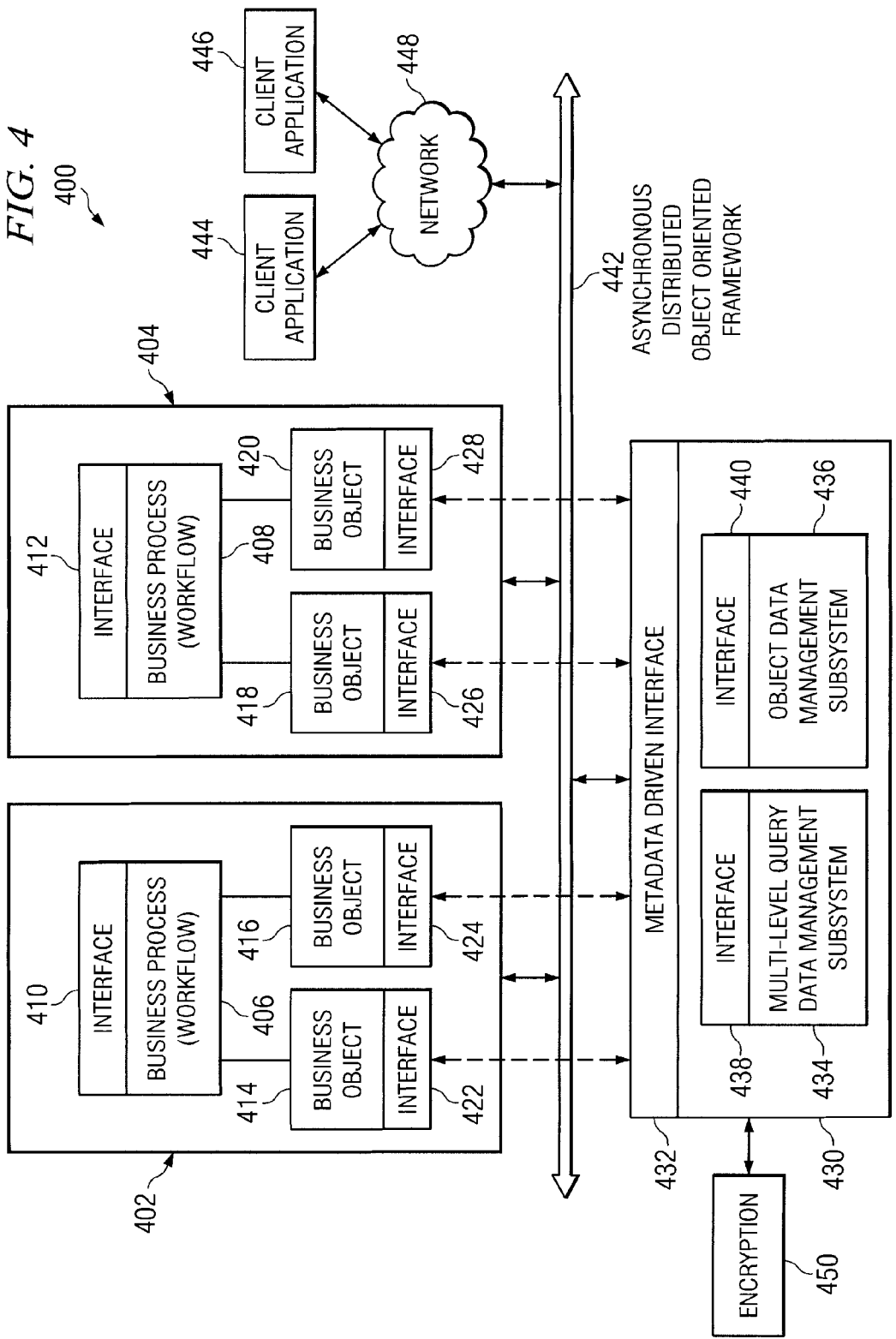
FIG. 4 depicts a functional block diagram of a service architecture in accordance with an illustrative embodiment.

Turning now to FIG. 4, a functional block diagram of a service architecture is depicted in accordance with an illustrative embodiment. Service architecture 400 is a software platform that caters to the deployment of runtime component services 402 and 404, which may be used in an enterprise architecture, such as enterprise architecture 300 of FIG. 3. Software component services 402 and 404 are two-layer abstractions in which the upper layer specifies business processes 406 and 408 as mini automated workflows. Business processes 406 and 408 may be a business process that is followed by a human resources department in collecting and storing employee information or a business process that is followed by an institute of higher education in collecting and storing student information. Access to the business processes 406 and 408 is through interfaces 410 and 412 which may be any type of interface such as an extensible markup language (XML) or Internet inter-ORB protocol (IIOP) interface. The lower layer consists of business objects 414, 416, 418, and 420 that implement the information and data models on which the business processes operate. Although each lower layer depicts two business objects, any number of business objects may be used depending on the particular implementation. Business objects use a metadata driven (MDD) interface 422, 424, 426, or 428 to interact with the enterprise repository 430, using enterprise repository 430 as their persistent storage.

In these illustrative examples, enterprise repository 430 is comprised of a metadata driven interface 432, a multi-level query data management subsystem 434 and an object data management subsystem 436. Both multi-level query data management subsystem 434 and object data management subsystem 436 have interfaces 438 or 440 to interact with metadata driven interface 432 of enterprise repository 430. Interfaces 410, 412, 422, 424, 426, 428, 432, 438, and 440 may be any type of interface such as an extensible markup language (XML), Internet inter-ORB protocol (IIOP), or interface definition language (IDL) interface.

Asynchronous distributed object oriented framework 442 provides the framework for client applications 444 and 446 through network 448 to access enterprise repository 430 and software runtime component services 402 and 404. In this approach, new services are created as new run-time deployable components. The services are built from the collaboration of business objects 414, 416, 418, and 420 that are themselves software runtime component services 402 and 404. In a normal component, the information model is mapped directly to the enterprise repository 430. It is this tight coupling between the business objects 414, 416, 418, and 420 and its enterprise repository 430 that induces inflexibility into a typical enterprise. The metadata aware business objects approach removes the rigid constraints between business objects 414, 416, 418, and 420 and enterprise repository 430. With the metadata interface, enterprise repository 430's need of business objects 414, 416, 418, and 420 can be dynamically created on the fly. In addition, new relationships and associations between component model specifications can also be dynamically created. Service architecture 400 may also include an encryption mechanism 450, which may be any type of known encryption mechanism, to protect those records which are vital.

This approach paves the way for a new breed of enterprise software, one in which arbitrary interaction and interoperation may be made between components to define the services offered by the enterprise. Thus, businesses and other entities, such as an institute of higher education, may be able to use the provided interaction and interoperation of an enterprise application to provide a way to coordinate and certify employee records.

Figure 5:
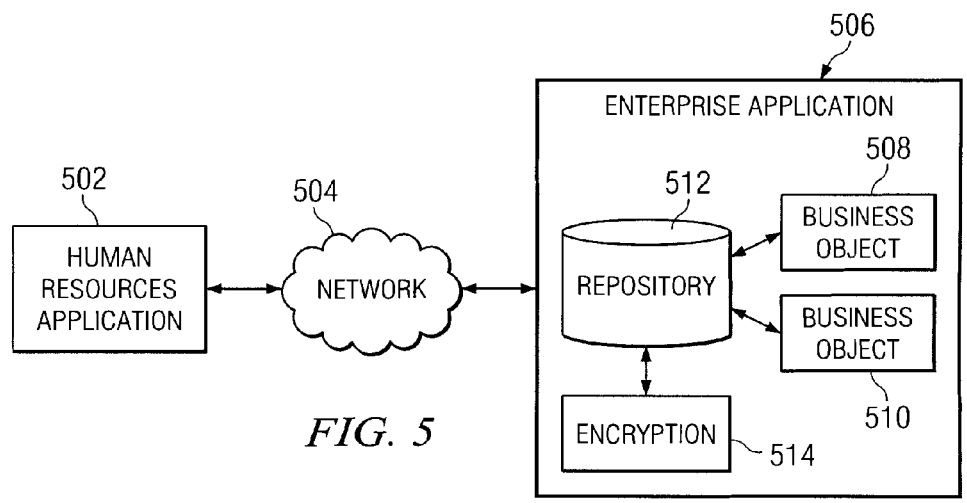
FIG. 5 depicts an exemplary implementation of compiling and storing data or information relating to employment in accordance with an illustrative embodiment.

FIG. 5 depicts an exemplary implementation of compiling and storing data or information relating to employment in accordance with an illustrative embodiment. As human resource application 502, which may be a client application such as client application 444 or 446 of FIG. 4, gathers information for employees, the information may be sent via network 504, which may a network such as network 102 of FIG. 1 or network 448 of FIG. 4, to enterprise application 506 such as enterprise application 310, 312, or 314 of enterprise architecture 300 of FIG. 3. Business objects 508 and 510 create records or historical events for each employee. Business objects 508 and 510 may be business objects such as business objects 414, 416, 418, and 420 of FIG. 4. The records or historical events created by business objects 508 and 510 are then stored as historical objects in repository 512, which may be any type of data structure such as enterprise repository 430 of FIG. 4.

The historical events may be, for example, information that is both personal and professional for the employee. For example, personal events may include items such as social security number, address, home telephone number, medical information, marital status, race, ethnicity, mailing address, emergency contacts, and spousal information. Exemplary professional events may include items such as performance, reviews, reprisals, management chain, salary, salary raises, resources, business contacts, scheduled work hours, shift worked, tax jurisdiction, current department, department history, work location, employee status, leave of absence information, and length of employment. Historical events may also be information relating to the education of the employee, such as records kept by an institute of higher education during the time the employee was a student. The particular items may be different depending on the implementation.

A more detailed example of professional information is for an employee who works in a procurement position. This type of employee may hold sole responsibility for any number of resources, such as contracts, with independent vendors. Thus, employment records and historical events are vital to any business and those records are stored by business objects 508 and 510 in repository 512 as historical objects, using repository 512 as their persistent storage. Most employee historical records are encrypted or certified using encryption 514, which may use an encryption mechanism, such as the encryption mechanism used in encryption 450 of FIG. 4. Normally when an employee leaves a company, most of the employee's information is deleted from repository 512. Those items that are normally kept are the employee's identifying information as well as length of employment.

The illustrative embodiments retain all information pertaining to the employee throughout the employee's career. Additionally, the employee's records are portable from employer to employer. Information in the employee's records that is private to one company is kept private through means of encryption provided by encryption 514. However, the personal information that would normally be disclosed by the employee on an employment application is left under a public view. The viewable public information allows a new employer who is certified as a trusted authority to quickly verify the information of a prospective employee.

Additionally, some information may be semi-private, such as social security number and age, and is encrypted to where another certification is required to access that information. The semi-private certification key may be provided by the employee and only upon authorization, as a trusted authority, will an employer be able to access this information. Furthermore, if an employee ever returns to a company that the employee previously worked for, all of the employee's personal and professional information is still available. Retaining this information may also be beneficial to the company especially in view of an employee who works in procurement and has sole responsibility for any number of contracts with independent vendors.

FIG. 6 depicts an exemplary employee record in accordance with an illustrative embodiment. In universal employment record 602, the employee is shown to have historical events showing employment with Company A from 1985 to 1990. This information is marked as public while the bad review this employee had in 1988 is marked as private. In universal employment record 604, the employee is shown to have historical events showing employment with Company B from 1990 to 1995. This information is marked as public while the technical award the employee received in 1993 is marked as private. In universal employment record 606, the employee's historical events shows a return to Company A from 1995 to 2000. This information is marked as public while the reprimand the employee received 1998 is marked as private. Finally, in universal employment record 608, the employee's historical events show a return to Company B from 2000 to 2005. This information is marked as public while the product design and architecture award the employee received in 2002 is marked as private.

Thus, information is retained for the employee for each company with which the employee has been employed. Public, private, and semi-private (not shown) information is accessible to anyone who is certified as a trusted authority under different levels of encryption and certification.

FIG. 7 depicts a version history of an employee's records in accordance with an illustrative embodiment. Employee's position history 700 shows an exemplary listing all of the positions that an employee has held within a business. Position 702 illustrates that the employee is currently employed as a director. Underneath position 702, is position 704 which shows the employee's previous position as a manager. Position 704 also shows that the employee attended management classes 706 through a Business Management School B, which may have been a requirement to be promoted. Position 708 shows that the employee was an engineer prior to becoming a manager at position 704. Position 708 also shows that prior to being an engineer that the employee attended a University C, educational records 710.

Returning to position 702, the employee position may be certified by his employer, Company A. At position 704, while the employee position may be certified by Company A, management classes 706 are only certifiable through a third party such as Business Management School B. However, Business Management School B may no longer be in business and, therefore, certifying the classes may not be possible. Likewise, educational records 710 are only certifiable through University C, which is also a third party. At position 708, the employee's engineer position may be certified with Company D. Thus, while employee's position history 700 provides a timeline or version history of the employee's employment history, only certain pieces of the employee's employment history are certifiable.

FIG. 8 is a flowchart of storing employee historical events in accordance with an illustrative embodiment. Storing employee historical events may be performed by business objects 508 and 510 of FIG. 5. As the operation begins, a request is received to store employee historical events (step 802). A determination is made as to whether the historical events are to be marked as public (step 804). If the historical events are indicated as public, the historical events are simply stored as historical objects in an employee records repository (step 806), with the operation ending thereafter. Determining if historical events should be public, private, or semi-private may be through parsing the historical object of the historical event to see if there is a marking within the request or prompting the user to see if the historical events should be certified or encrypted.

If at step 804 the employee historical events are not indicated as public, then a determination is made as to whether the historical events are to be marked as semi-private (step 808). If the historical events are to be marked as semi-private, then the historical events are encrypted as semi-private with a semi-private encryption key (step 810) and stored as semi-private historical objects in the employee records repository (step 806), with the operation ending thereafter. If at step 808, the historical events are not marked as semi-private, then the historical events are encrypted using the private encryption key (step 812) and stored as private historical objects in the employee records repository (step 806), with the operation ending thereafter.

FIG. 9 is a flowchart of retrieving employee historical events in accordance with an illustrative embodiment. Retrieving employee historical events may be performed by human resources application 502 and enterprise application 506 of FIG. 5. As the operation begins, a request for access to an employee's historical events is received (step 902). All of the historical objects pertaining to the employee are retrieved from the employee records repository (step 904). The historical objects are parsed and each piece of the employee's historical objects is analyzed to determine as to whether that historical object is marked private or semi-private (step 906). If the historical objects is not marked private or semi-private, the employee information is displayed as historical events to the requester (step 908), with the operation ending thereafter. If at step 906, the employee historical object is marked private or semi-private, the requester is prompted for a decryption key (step 910). If the requester is certified as a trusted authority, each historical object is attempted to be decrypted (step 912) and only those historical objects that are decrypted are displayed as historical events to the requester (step 908), with the operation ending thereafter.

An alternative embodiment allows the review of an employee's professional information after the employee has left the company. While most companies may delete most information pertaining to an employee upon departure, the illustrative embodiment retains all information stored for the employee during his tenure with the company. As mentioned above, if an employee is in a procurement position, that employee may have sole responsibility for any number of contracts with independent vendors. Although the contracts are not deleted upon the employee departing the company, any record of who the independent vendor was working with may be lost. Moreover, once the employment information for a particular employee is lost, the management chain of that employee is also lost.

The alternative embodiment keeps this information intact. For example, a new employee who is filling the spot that was recently vacated may be able to view all contracts associated with the previous employee, but this time the new employee will not be able to see any other private information other than the contract information. Additionally, the contracts are now assigned to the new employee and the employee records will associate the contracts as handled by both the previous employee and the new employee. Thus, a company may not only encrypt private employee information as a standard but may have different levels of encryption pertaining to the specific private employee information.

Thus, the different illustrative embodiments provide for coordinating disparate pieces of employee information, and provide for version control of employee records to associate how the employee's records and resources have moved between individuals. As an employee changes jobs both internally and externally, the employee records are updated with all pertinent information as well as all resources associated with the employee. This allows companies to verify employment history and employee location information.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of associating historical events with a user, the computer implemented method comprising:

receiving a request from a user to store an employment historical event associated with the user;

determining whether the employment historical event is to be marked as public;

responsive to determining that the employment historical event is to be marked as public, storing the employment historical event as a public historical object in an employee record repository associated with the user in a storage device;

responsive to determining that the employment historical event is not to be marked as public, determining whether the employment historical event is to be marked as semi-private;

responsive to determining that the employment historical event is to be marked as semi-private, storing the employment historical event as a semi-private historical object that is encrypted with a semi-private encryption key in the employee record repository associated with the user in the storage device;

responsive to determining that the employment historical event is not to be marked as semi-private, storing the employment historical event as a private historical object that is encrypted with a private encryption key in the employee record repository associated with the user in the storage device;

receiving a request from a requestor to access employment historical events stored as historical objects in the record repository associated with the user;

retrieving all historical objects stored in the record repository associated with the user;

determining whether any of the historical objects retrieved from the record repository associated with the user are marked as semi-private or private;

responsive to determining that none of the historical objects retrieved from the record repository associated with the user are marked as semi-private or private, displaying public historical objects associated with the user as employment historical events for the user on a display device for use by the requestor; and responsive to determining that one or more of the historical objects retrieved from the record repository associated with the user are marked as semi-private or private, prompting the requestor for semi-private and private decryption keys corresponding to the retrieved historical objects marked as semi-private or private, decrypting only those historical objects within all the historical objects retrieved from the record repository associated with the user marked as semi-private or private that correspond to the semi-private and private decryption keys provided by the requestor; and displaying the public historical objects and only those semi-private and private historical objects that are decrypted by the semi-private and private decryption keys provided by the requestor as the employment historical events for the user on the display device for use by the requestor.

2. A data processing system comprising:
a bus system;
a communications system connected to the bus system;
a memory connected to the bus system, wherein the memory includes a set of instructions; and
a processing unit connected to the bus system, wherein the processing unit executes the set of instructions to receive a request from a user to store an employment historical event associated with the user;

determine whether the employment historical event is to be marked as public;

store the employment historical event as a public historical object in an employee record repository associated with the user in a storage device in response to determining that the employment historical event is to be marked as public;

determine whether the employment historical event is to be marked as semi-private in response to determining that the employment historical event is not to be marked as public;

store the employment historical event as a semi-private historical object that is encrypted with a semi-private encryption key in the employee record repository associated with the user in the storage device in response to determining that the employment historical event is to be marked as semi-private;

store the employment historical event as a private historical object that is encrypted with a private encryption key in the employee record repository associated with the user in the storage device in response to determining that the employment historical event is not to be marked as semi-private;

receive a request from a requestor to access employment historical events stored as historical objects in the record repository associated with the user;

retrieve all historical objects stored in the record repository associated with the user;

determine whether any of the historical objects retrieved from the record repository associated with the user are marked as semi-private or private;

display public historical objects associated with the user as employment historical events for the user on a display device for use by the requestor in response to determining that none of the historical objects retrieved from the record repository associated with the user are marked as semi-private or private; and prompt the requestor for semi-private and private decryption keys corresponding to the retrieved historical objects marked as semi-private or private, decrypt only those historical objects within all the historical objects retrieved from the record repository associated with the user marked as semi-private or private that correspond to the semi-private and private decryption keys provided by the requestor; and display the public historical objects and only those semi-private and private historical objects that are decrypted by the semi-private and private decryption keys provided by the requestor as the employment historical events for the user on the display device for use by the requestor in response to determining that one or more of the historical objects retrieved from the record repository associated with the user are marked as semi-private or private.

3. A computer program product stored on a computer readable storage medium having computer usable program code embodied thereon for associating historical events with a user, the computer program product comprising:

computer usable program code for receiving a request from a user to store an employment historical event associated with the user;

computer usable program code for determining whether the employment historical event is to be marked as public;

computer usable program code, in response to determining that the employment historical event is to be marked as public, for storing the employment historical event as a public historical object in an employee record repository associated with the user in a storage device;

computer usable program code, in response to determining that the employment historical event is not to be marked as public, for determining whether the employment historical event is to be marked as semi-private;

computer usable program code, in response to determining that the employment historical event is to be marked as semi-private, for storing the employment historical event as a semi-private historical object that is encrypted with a semi-private encryption key in the employee record repository associated with the user in the storage device;

computer usable program code, in response to determining that the employment historical event is not to be marked as semi-private, for storing the employment historical event as a private historical object that is encrypted with a private encryption key in the employee record repository associated with the user in the storage device;

computer usable program code for receiving a request from a requestor to access employment historical events stored as historical objects in the record repository associated with the user;

computer usable program code for retrieving all historical objects stored in the record repository associated with the user;

computer usable program code for determining whether any of the historical objects retrieved from the record repository associated with the user are marked as semi-private or private;

computer usable program code, in response to determining that none of the historical objects retrieved from the record repository associated with the user are marked as semi-private or private, for displaying public historical objects associated with the user as employment historical events for the user on a display device for use by the requestor; and computer usable program code, in response to determining that one or more of the historical objects retrieved from the record repository associated with the user are marked as semi-private or private, for prompting the requestor for semi-private and private decryption keys corresponding to the retrieved historical objects marked as semi-private or private, decrypting only those historical objects within all the historical objects retrieved from the record repository associated with the user marked as semi-private or private that correspond to the semi-private and private decryption keys provided by the requestor; and displaying the public historical objects and only those semi-private and private historical objects that are decrypted by the semi-private and private decryption keys provided by the requestor as the employment historical events for the user on the display device for use by the requestor.

\* \* \* \* \*